Figure 3:
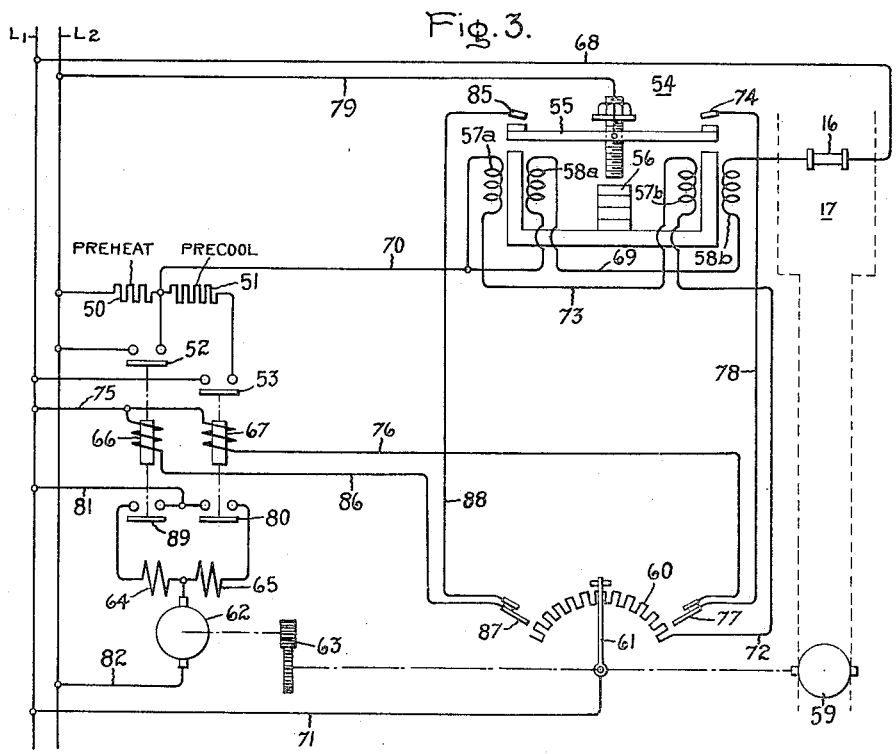

March 13, 1951     R. A. GUND     2,545,353
TEMPERATURE CONTROL SYSTEM
Filed May 23, 1945     2 Sheets-Sheet 1
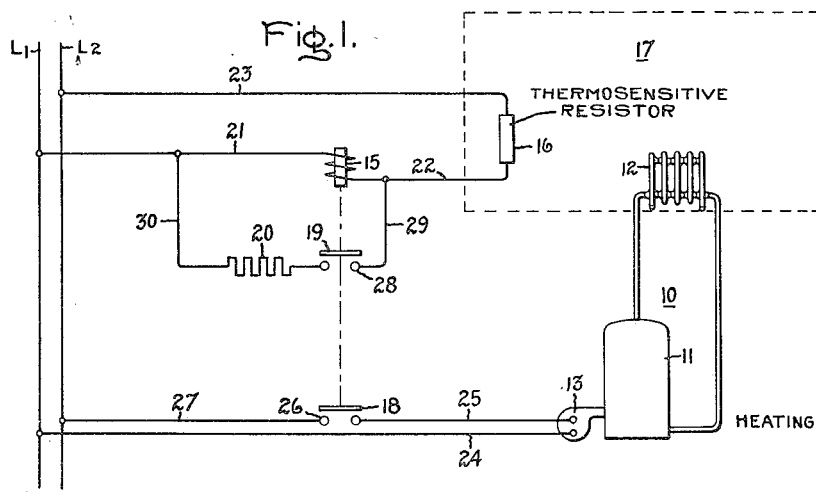
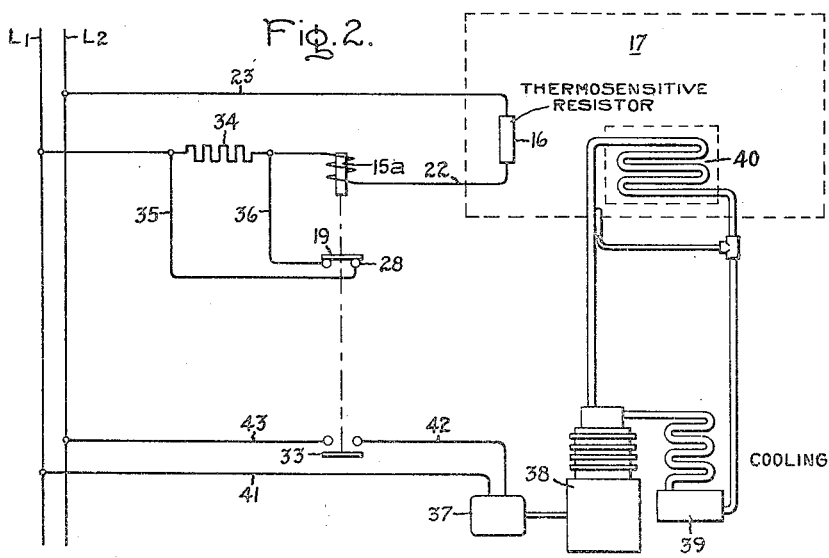
Inventor:
Russell A. Gund,
by Edwin Z. Rich
His Attorney.

Inventor:
Russell A. Gund,
by *Edwin L. Rich*
His Attorney

Patented Mar. 13, 1951

2,545,353

UNITED STATES PATENT OFFICE 2,545,353

TEMPERATURE CONTROL SYSTEM

Russell A. Gund, Schenectady, N. Y., assignor to General Electric Company, a corporation of New York Application May 23, 1945, Serial No. 595,350

2 Claims. (Cl. 236—78)

The invention relates to temperature control systems, particularly automatic heating, cooling, or other temperature regulating systems wherein a temperature responsive control element in the form of a self-heating thermosensitive resistor that varies its resistance primarily in response to variation in a predetermined temperature condition serves to control the energization of electric control apparatus for regulating the temperature condition.

In all such systems, when the energizing current controlled by the temperature responsive resistor becomes appreciable, then the resistor may become self-heated due to the energy dissipated in it by the current controlled thereby.

The principal object of the present invention is to provide improved automatic means for varying the self-heating of the temperature responsive resistor so as to progressively accelerate the response of the control system to a variation of the temperature condition initiated under the control of the resistor.

A more specific object is to provide an improved temperature control system wherein the electric temperature control or regulating apparatus that is operated under the control of the temperature sensitive resistor is provided with special means for automatically varying the current through the temperature sensitive resistor and therefore the self-heating thereof in such a way as to increase the overall effective temperature control sensitivity of the system.

Due to the improved automatic variation of the self-heating of the temperature sensitive resistor in accordance with the present invention a correspondingly less variation in the predetermined temperature condition to which the resistor is responsive is required to produce operation of the electric temperature control apparatus. Hence correspondingly greater sensitivity of the entire temperature control system is obtained. Consequently the present invention has a wide field of application wherever a resistor having either a positive or a negative coefficient of resistance serves as the temperature responsive control element. However, since a temperature sensitive resistor having a negative temperature coefficient can control an appreciable current and at the same time provide a relatively large variation in its resistance upon a relatively small variation in its resistance upon a relatively small variation in its temperature, the present invention is particularly adapted for automatically varying the self-heating of such a negative temperature coefficient resistor in a temperature responsive control or regulating system.

In carrying out the invention in a heating system with a negative temperature coefficient resistor serving as the temperature sensitive element, means are provided for automatically increasing the self-heating of the resistor a predetermined amount whenever the heating apparatus is operated to increase the predetermined temperature condition to which the resistor is responsive and vice versa. Likewise, in carrying out the invention in a cooling system whenever the cooling apparatus is operated to decrease the predetermined temperature condition, means are controlled thereby for automatically decreasing the self-heating of the resistor a predetermined amount and vice versa. In the first instance when the self-heating of the negative temperature coefficient resistor is increased a predetermined amount, conditions are thereby established to decrease the resistivity of the resistor correspondingly with a time delay. Consequently a progressively smaller increase of the predetermined temperature condition will be required during the time delay to effect response of the electric control apparatus controlled by the resistor. Similarly, in the latter case, the automatic decrease in the self-heating of the resistor a predetermined amount will establish conditions for automatically increasing the resistance thereof correspondingly with a time delay. As a result a progressively smaller decrease of the predetermined temperature condition will be required during the time delay to effect response of the electric control apparatus. In both cases the temperature sensitive resistor will respond jointly to the variation of the predetermined temperature condition and with a time delay to the corresponding variation in the self-heating effect of the current controlled by the resistor.

The present invention is of particular advantage in a reversible modulating temperature control system, particularly a variable step by step reversible modulating system of the type disclosed and claimed in the Hall applications, Serial Nos. 471,739, filed September 11, 1942, now Patent Number 2,404,227, and 593,213, filed May 11, 1945, now Patent Number 2,515,771.

In such reversible step by step temperature modulating systems, a negative temperature coefficient resistor controls a reversing relay to reversely operate an electrically controlled damper, flap, or other reversible temperature controlling means. A control rebalancing or modulating resistor is operated in accordance with the movement of the damper, flap or other means to control the relay so as to provide variable step by step position modulating operation of the temperature controlling damper, flap or other means.

A further object of the present invention is to control the self-heating of the temperature responsive resistor in a reversible step by step modulating temperature control system to provide more and shorter steps and therefore more accurate and uniform temperature control.

A still further object is to provide an improved reversible step by step modulating temperature control system having selective control means capable of either increasing or decreasing the self-heating current of the negative coefficient temperature responsive resistor and arranged so as to increase the self-heating thereof at the beginning of each step to increase the temperature condition to which the resistor is responsive and to decrease the self-heating thereof at the beginning of each step to decrease the temperature condition to which the resistor is responsive.

Figure 4:
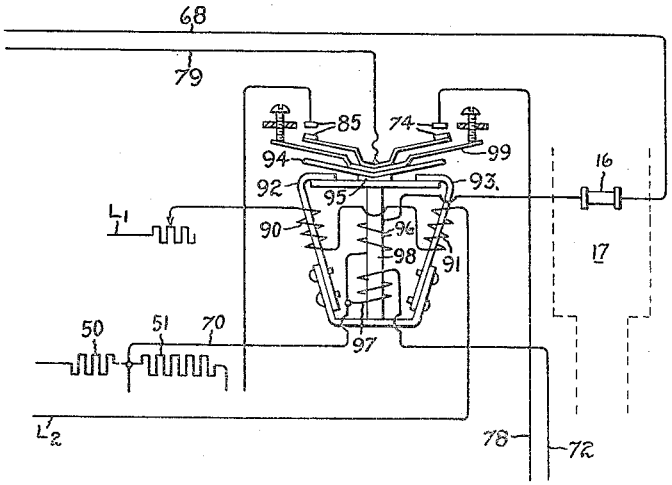

Further objects and advantages of the invention will appear in the following description of the accompanying drawings schematically illustrating preferred forms of the invention and in which Fig. 1 is a schematic circuit diagram showing the invention embodied in a heating control system employing a negative temperature coefficient resistor as the temperature sensitive element; Fig. 2 is a similar schematic circuit diagram showing the invention embodied in a cooling control system utilizing a negative temperature coefficient resistor as the temperature sensitive control element; Fig. 3 is a schematic diagram of a reversible step by step modulating temperature control system employing a negative temperature coefficient resistor as the temperature sensitive element and Fig. 4 shows a modified form of reversible relay which may be used in the modulating system of Fig. 3, if desired.

In the heating control system of Fig. 1 the heating apparatus 10 is illustrated as a typical domestic house heating boiler 11, either steam or hot water, and connected to supply heat to the radiator 12 upon operation of a suitable burner mechanism 13 which may be a conventional oil burner such as shown. The starting and stopping of operation of the burner 13 is controlled by an electrical relay 15 having its pick-up and drop-out energization under the control of a temperature sensitive resistor 16. The resistor 16 has a negative temperature coefficient of resistance and is responsive to variations of the temperature in the space 17 heated by the radiator 12.

Relay 15 is provided with a normally closed contact 18 for closing and opening the energizing circuit of the burner 13. A second normally closed relay contact 19 is provided for closing and opening the circuit of a loading resistor 20 for controlling the self-heating of the temperature sensitive resistor 16 in such a way as to accelerate the response of the control system to variation of the temperature of the space 17 whenever a heating operation is initiated or terminated under the control of the resistor 16.

The operation of the heating control system of Fig. 1 is as follows. Let us assume that relay 15 is energized sufficiently to pick up and open contacts 18 and 19 as shown and the temperature of the space 17 is falling so as to require operation of the heater. As the temperature of resistor 16 decreases, its resistance increases thereby reducing the pick-up energization of the operating winding of relay 15 to the drop-out point where the relay will respond to close both contacts 18 and 19. The temperature sensitive resistor 16 is connected in series in the energizing circuit for the operating winding of relay 15 with the circuit extending from supply line L1 through conductor 21, the operating winding of relay 15, conductor 22, the negative temperature coefficient resistor 16 which is responsive jointly to the heating effect of the energizing current in the circuit and to variations of the temperature in space 17, and thence through conductor 23 to supply line L2.

Upon closure of contact 18, burner 13 is energized through a circuit extending from supply line L1 through conductor 24, burner 13, conductor 25, contact 18 when it is closed to bridge the cooperating contacts 26 and thence through conductor 27 to supply line L2. This initiates operation of burner 13 to heat boiler 11 and thus supply heat to radiator 12 so as to increase the temperature in the space 17.

Simultaneously with the initiation of the heating operation, contact 19 bridges its cooperating contacts 28 thereby connecting the loading resistor 20 in parallel circuit with the operating winding of relay 15 through conductors 29 and 30. As a result, the current through the temperature sensitive resistor 16 is increased a predetermined amount dependent upon the value of the loading resistor 20. Consequently the self-heating effect of the current controlled by resistor 16 is correspondingly increased. This increased self-heating effect tends to increase the temperature of resistor 16 with a time delay entirely irrespective of the change in temperature of space 17 produced by operation of the heating apparatus. Consequently a progressively lesser increase in the temperature of space 17 is required to reduce the resistance of resistor 16 sufficiently to increase the energization of relay 15 to the pick-up point whereupon both contacts 18 and 19 are opened to stop operation of the heating apparatus and to decrease the self-heating of resistor 16. This decrease in self-heating serves to reduce the temperature of resistor 16 with a time delay and thus increase its resistivity. Hence a progressively lesser decrease in the temperature of space 17 will be required to further reduce the temperature of resistor 16 to the point where relay 15 will again drop out and restart operation of the heating apparatus. As a result the overall effective temperature sensitivity of the entire control system is materially increased due to the automatic variation in self-heating effect of the current through resistor 16 reducing the effective temperature control differential of resistor 16 required to operate the system.

In the cooling control system of Fig. 2, relay 15a is provided with the normally closed contact 19 and a normally open contact 33. In this system, current control means in the form of a resistor 34 is inserted in series in the energizing circuit of the operating winding of relay 15a in order to control the self-heating of the negative temperature coefficient temperature sensitive resistor 16. Resistor 34 is connected by conductors 35 and 36 to be short-circuited whenever the normally closed relay contact 19 bridges its cooperating contacts 28.

The normally open relay contact 33 controls the energizing circuit of the driving motor 37 for the compressor 38 of the cooling equipment which serves to supply a cooling medium through the condenser 39 to the cooling unit 40 for space 17.

The operation of the cooling control system of Fig. 2 is as follows. When the temperature of space 17 increases the temperature of resistor 16 also increases and therefore its resistance will decrease and thereby energize relay 15a sufficiently to pick up and close contact 33 to start operation of the cooling equipment. The compressor driving motor 37 is energized through conductors 41, 42 and 43 upon closure of contact 33. Thus a cooling operation is initiated to reduce the temperature of the space 17. At the same time normally closed contact 19 opens to remove the short-circuit from the current regulating resistor 34. As a result, the energizing current through the operating winding of relay 15a controlled by resistor 16 is decreased towards the drop-out point with a corresponding decrease in the self-heating effect of this current in resistor 16. Thus, conditions are established to produce a reduction in temperature of the resistor 16 with a time delay irrespective of the reduction in temperature in space 17 due to the operation of the cooling equipment. Consequently a progressively lesser reduction in the temperature of the control resistor 16 due to reduction of the temperature in space 17 is required to increase the resistance of resistor 16 sufficiently to drop out relay 15a and thereby open contact 33 to stop further operation of the cooling equipment. As soon as the operation of the cooling equipment is stopped by opening of contact 33, the normally closed contact 19 will reestablish the short-circuit for resistor 34, thereby correspondingly increasing the energizing current through the operating winding of relay 15a towards the pick-up point with a resulting increase in the self-heating effect in the resistor 16. Hence, a progressively lesser increase in the temperature of space 17 will be required to restart operation of the cooling equipment due to the increase in the self-heating of resistor 16 produced by short-circuiting control resistor 34.

The reversible step by step modulating temperature control system shown in Fig. 3 is substantially the same as that disclosed and claimed in the above mentioned Hall application, Serial No. 471,739, except for the addition of the pair of special self-heating control resistors 50 and 51 and the corresponding switching control contacts 52 and 53 therefor. Briefly, this modulating temperature control system consists of a flux balancing relay 54 having a reversely tilting armature 55 polarized by the permanent magnets 56 and operated from the mid control position (to which it is biased by suitable springs) in accordance with the variable preponderance of the two pairs of opposing magnetizing windings 57a, 57b, and 58a, 58b. The windings 58a and 58b are connected in series with the negative temperature coefficient unbalancing control resistor 16 which is responsive to the temperature of the space 17 containing a variable heat generating apparatus such as an engine, not shown. The temperature of space 17 is regulated by admitting cooling air thereto under the control of the damper 59.

The opposing pair of relay windings 57a and 57b are connected in series with the relay rebalancing or modulating resistor 60 which is varied by the sliding contact arm 61 in accordance with the movement of the damper 59 by the reversible operating motor 62, preferably operating through suitable speed reducing gearing 63. Motor 62 is of the usual split field reversing type having a field 64 for operating motor 62 in a direction to close damper 59 and a field 65 for operating motor 62 in a direction to open damper 59. Motor 62 is energized respectively through field windings 64 and 65 by contactors 66 and 67 selectively energized under the control of the polarized relay 54.

The operation of the modulating system of Fig. 3 is as follows. Since the reversible tilting armature 55 of the relay is shown in its mid position, the damper 59 is in such position as to maintain at least temporarily the temperature in space 17 at the desired value. In case the temperature in space 17 increases, the resulting increase in the temperature of resistor 16 will reduce the resistance thereof to increase the energization of the pair of relay windings 58a and 58b so as to magnetically predominate over the opposing windings 57a and 57b. The energizing circuit for relay windings 58a and 58b may be traced from supply line L1 through conductor 68, resistor 16, winding 58b, conductor 69, winding 58a, conductor 70, and thence through control resistor 50 to supply line L2. The energizing circuit for the relay windings 57a and 57b may be traced from supply line L1 through conductor 71, sliding contact arm 61, rebalancing resistor 60, conductor 72, relay winding 57b, conductor 73, relay winding 57a, and thence through conductor 70 and control resistor 50 to supply line L2. Due to the magnetic predominance of windings 58a and 58b, the centrally pivoted armature 55 will tilt counterclockwise to close the relay contacts 74 and thereby energize contactor 67 through a circuit extending from supply line L1 through conductor 75, the operating winding of contactor 67, conductor 76, limit switch 77, conductor 78, relay contacts 74 and conductor 79 to supply line L2. The resulting operation of contactor 67 closes contact 80 to energize motor 62 through the field winding 65 so as to operate damper 59 in the opening direction. The circuit through motor 62 extends from supply line L1, conductor 81, contact 80, field winding 65, motor armature 62, and conductor 82 to supply line L2. The resulting operation of motor 62 starts opening of damper 59 and movement of contact 61 to vary resistance 60 so as to rebalance the magnetizing effect of the two pairs of opposing relay windings and thereby return relay armature 55 to its mid position after damper 59 has been moved a step in the opening direction.

Upon the initiation of the step of opening movement of damper 59, as just described, contactor 67 closes contact 53 at the same time that contact 80 is closed. The closure of contact 53 connects special loading resistor 51 in parallel with the energizing circuits of both of the pairs of relay windings thereby increasing the current flow through special control resistor 50. As a result the voltage drop through control resistor 50 is increased thereby decreasing the voltage applied to the energizing circuits of both pairs of relay windings. Due to the decreased voltage, the current in both windings is decreased correspondingly. However, due to the decrease in current, the self-heating effect of temperature sensitive resistor 16 is increased. Thus it will be seen that by means of the present invention upon the initiation of each step of damper movement in the opening direction, the self-heating effect of resistor 16 is decreased. This produces two results both of which tend to increase the effective control sensitivity. First, a lesser movement of the resistance control arm 61 is required to effect rebalancing of the relay since the magnetic predominance of the relay windings is reduced. Second, a lesser reduction in the temperature of the space 17 is required to reestablish magnetic equilibrium of the relay to return the tilting relay member 55 to its mid position to which it is biased.

Thus the relay 54 is rebalanced after a shorter opening step of damper 59. When the relay armature 55 returns to the mid position, contactor 67 is deenergized so as to stop operation of damper positioning motor 62 by opening a contact 80 and at the same time open contact 53 to disconnect loading resistor 51. The disconnection of loading resistor 51 reduces the voltage drop through control resistor 50 to its previous value with a resultant increase in the self-heating effect of the temperature sensitive resistor 16.

In case the temperature in space 17 still continues to rise after the short opening step of damper 59, the continuing increase in temperature of resistor 16 will again effect a magnetizing predominance of relay windings 58a and 58b over the opposing pair of windings and the relay armature 55 will respond to again close contacts 74 and again initiate another short opening step for the damper 59. In accordance with the present invention, at the beginning of each opening step loading resistor 51 will be connected by the closure of contact 53 to reduce both the unbalancing magnetic preponderance of the relay windings and the self-heating effect in resistor 16. The overall result is that more opening steps of damper 59 are provided and each step is shorter. In this way the overall sensitivity of the temperature control system is increased and more accurate and uniform modulation of the position of damper 59 to the proper position for establishing thermal equilibrium in space 17 is obtained.

Assuming that sufficient opening steps of damper 59 have occurred to produce thermal equilibrium in space 17, if now the temperature in space 17 should happen to decrease, resistor 16 will respond to increase its resistance, thereby decreasing the energization of the pair of relay windings 58a and 58b. In this case, the opposing magnetizing winding 57a and 57b will now predominate thus causing armature 55 to tilt in a clockwise direction and close the relay contacts 85. This energizes contactor 66 through a circuit extending from supply line L1 through conductor 75, winding of contactor 66, conductor 86, limit switch 87, conductor 88, relay contacts 85 and thence through conductor 79 to supply line L2. Thereupon, contactor 66 operates to close its contact 89 to energize the reversible positioning motor 62 through a circuit extending from supply line L1 through conductor 81, contact 89, closing motor field winding 64, armature 62 and conductor 82 to the other supply line. Thus motor 62 will operate in a direction to close damper 59 and at the same time move slidable contact 61 to vary resistor 60 so as to restore the balance between the two opposing pairs of relay windings after a closing step of operation of the damper has occurred.

When the closing step of damper operation is initiated by contactor 66, contact 52 thereof is operated to short-circuit control resistor 50. This short-circuiting of control resistor 50 results in increasing the voltage applied to both pairs of relay windings. Consequently there is an increased current flow through the negative temperature coefficient control resistor 16 with a corresponding increase in self-heating thereof to accelerate the response of the control apparatus to the change in temperature produced by the closing steps of operation of damper 59. This is due to the fact that the increased self-heating of resistor 16 serves to increase the temperature thereof irrespective of the increase in temperature in space 17 due to closing operation of damper 59. Consequently a lesser closing step of damper 59 will be required to rebalance the relay. As a result, more steps will be produced in closing the damper the amount required to reestablish thermal equilibrium in space 17 and hence more accurate and uniform temperature regulation is obtained.

In the modification shown in Fig. 4, the improved form of flux balancing relay of the Hall application, Serial No. 593,213, is shown with the connections required to substitute this relay in the reversible step by step modulating temperature control system of Fig. 3. The modified form of relay shown in Fig. 4 is provided with the pair of polarizing windings 90 and 91 which are continuously energized from the supply lines L1, L2 and serve to polarize the magnetic structure of the relay so as to provide opposite poles 92 and 93 adjacent the opposite ends of the reversely tilting magnetic armature 94. This armature is centrally pivoted on the central pole 95 which is oppositely magnetized by the variable predominance of the opposing magnetizing windings 96 and 97 on the core 98 extending from the central pole 95 to a point in the polarized circuit midway between the opposite poles 92 and 93. The reversely tilting relay armature 94 is biased to its mid position in which it is shown by means of the biasing spring 99. The two opposing magnetizing windings 96 and 97 are both connected to be energized through the self-heating control resistor 50 with the relative energization of winding 96 under the control of the negative temperature coefficient temperature responsive control resistor 16 and the relative energization of winding 97 under the control of the rebalancing resistor 60. Otherwise the circuit connections and the step by step operation of the system using the relay shown in Fig. 4 is substantially the same as previously described in connection with Fig. 3. Thus the self-heating of resistor 16 will be decreased at the beginning of each opening step of damper 59 and increased at the beginning of each closing step so as to increase the sensitivity and provide more and shorter steps in substantially the same way as previously described.

What I claim as new and desire to secure by Letters Patent of the United States, is:

1. In combination, a control resistor having a negative temperature coefficient of resistance and responsive jointly to the self-heating effect of the current controlled thereby and to a variable temperature condition, a balanced electromagnetic control means energized under the control of said resistor for oppositely unbalancing said control means in response to opposite variations in the resistance of said resistor, means including a resistor variable under the control of said control means for rebalancing said control means and means including a resistor under the control of said electromagnetic control means for varying said self-heating effect upon a predetermined unbalancing of said control means to accelerate the rebalancing of said control means.

2. In combination, a control resistor having a negative temperature coefficient of resistance and responsive jointly to the self-heating effect of the current controlled thereby and to a variable temperature condition, a balanced electromagnetic control means energized under the control of said resistor for oppositely unbalancing said control means in response to opposite variations in the resistance of said resistor, means including a resistor variable under the control of said control means for rebalancing said control means and means including a pair of resistors under the selective control of said electromagnetic control means, each for oppositely varying said self-heating effect upon a corresponding unbalancing of said control means to accelerate the rebalancing of said control means.

RUSSELL A. GUND.

REFERENCES CITED

The following references are of record in the file of this patent:

UNITED STATES PATENTS

| Number | Name | Date |
|---|---|---|
| 1,276,589 | Steinmetz | Aug. 20, 1918 |
| 1,715,750 | Gano | June 4, 1929 |
| 2,148,491 | Moore | Feb. 28, 1939 |
| 2,278,633 | Bagnall | Apr. 7, 1942 |
| 2,292,975 | Spangenberg | Aug. 11, 1942 |
| 2,318,358 | Bedford | May 4, 1943 |

FOREIGN PATENTS

| Number | Country | Date |
|---|---|---|
| 144,669 | Great Britain | Sept. 9, 1921 |
| 557,707 | Great Britain | Dec. 1, 1943 |
| 640,150 | Germany | Dec. 10, 1936 |